M. & L. S. LACHMAN.
METALLIC STRUCTURE.
APPLICATION FILED MAR. 11, 1909.
966,756.
Patented Aug. 9, 1910.
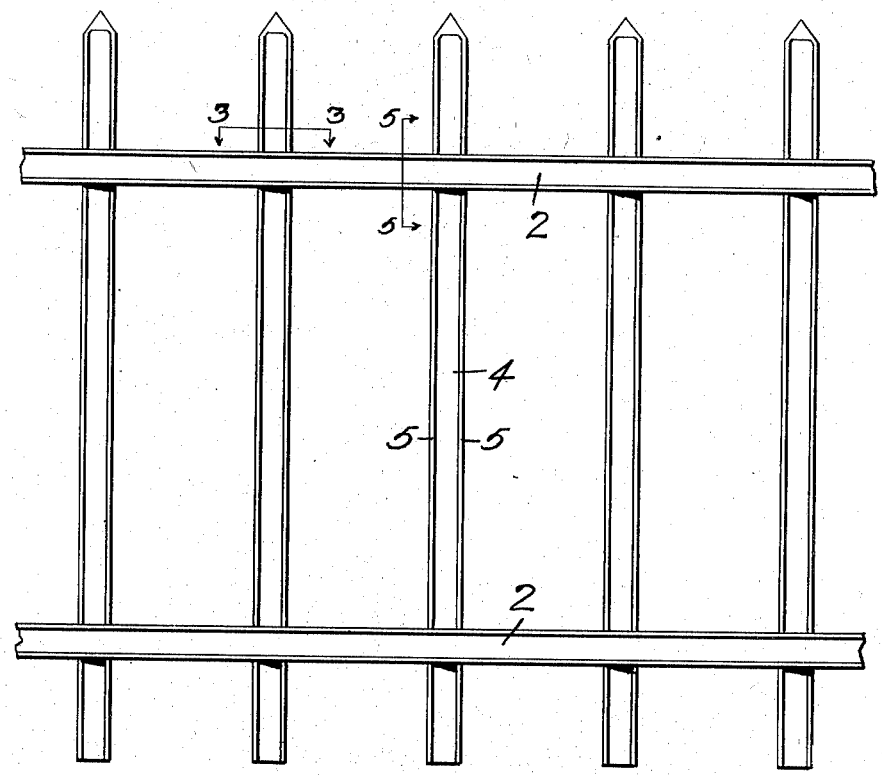
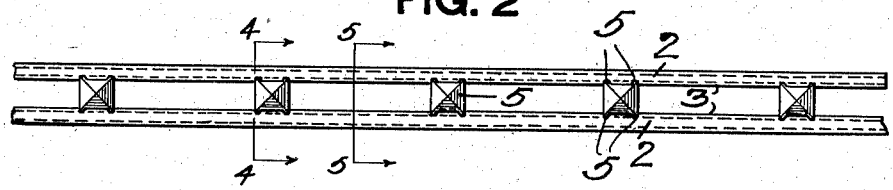
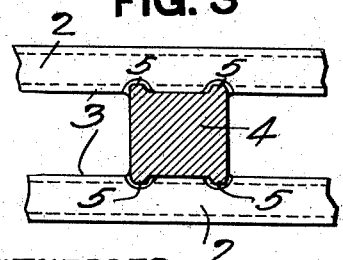
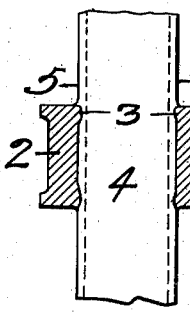
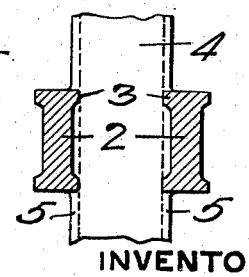
WITNESSES.
INVENTORS.

UNITED STATES PATENT OFFICE.

MAURICE LACHMAN AND LAURENCE S. LACHMAN, OF NEW YORK, N. Y.

METALLIC STRUCTURE.

966,756.      Specification of Letters Patent.      Patented Aug. 9, 1910.

Application filed March 11, 1909. Serial No. 482,817. REISSUED

*To all whom it may concern:*

Be it known that we, MAURICE LACHMAN and LAURENCE S. LACHMAN, residents of New York, in the county of New York and State of New York, have invented a new and useful Improvement in Metallic Structures; and we do hereby declare the following to be a full, clear, and exact description thereof.

Our invention relates to a metallic frame work or structure of a skeleton or open work character adapted for use as fencing, gates, grilles, and other devices to which it may be found applicable.

The object of our invention is to provide a construction of this character which is very rigid and durable and in which the parts composing the same cannot work loose, but are firmly united together to form an integral structure.

To these ends our invention comprises the novel features hereinafter set forth.

In the accompanying drawing Figure 1 is an elevation of a portion of our improved structure, the same being illustrated in the form of a fence; Fig. 2 is a plan view; Fig. 3 is an enlarged plan view showing the cross-pieces in section; and Figs. 4 and 5 are sections on the lines 4—4 and 5—5, respectively, Fig. 2, looking in the direction of the arrow.

In the drawing the numeral 2 designates longitudinal strips of metal which may be of any suitable dimensions, said strips having the longitudinal ribs 3 thereon which may be formed by rolling or otherwise. The cross-pieces or pickets 4, in the case of a fence, are provided with the ribs 5 extending along their outer edges and said cross-pieces are held between the several pairs of rails or strips 3, as clearly indicated in Figs. 2 and 3. The strips 3 and cross-pieces 4 are welded together so as to form an integral structure and this welding may be conveniently effected by electricity. Any suitable electric welding machine may be employed for this purpose, and the ridges 3 and 5 on the strips and cross-pieces will form the proper protuberances or projections for creating the necessary resistance when said projections are brought into contact and the current is applied so that these ridges will become heated up to a welding point, and when a slight pressure is applied the strips and cross-pieces will be joined or integrally united by what is commonly known as an autogenous weld. For fence purposes such a structure provides a very rigid and durable fence, as the pickets are not riveted or secured in such a manner that they may work loose and destroy the usefulness as well as the appearance of the fence, but the parts being welded together there is absolutely no possibility of any separation between the rails and the pickets and the life of the fence is extended indefinitely.

It is apparent that the structure may be formed in many different designs, whether for fencing or other purposes, and we do not in any way wish to limit ourselves to the specific construction illustrated and described. It is impossible for us to enumerate the uses to which a structure may be applied, but we desire to include within the scope of our invention any uses for the invention which may develop in the future.

What we claim is:

A metallic frame work or structure comprising longitudinally extending strips having ribs or ridges at their edges and cross-pieces uniting said strips having vertical ribs or ridges at their edges, said cross-pieces being held between pairs of said strips the ribs on said strips being electrically welded to the ribs on said cross pieces.

In testimony whereof, we the said MAURICE LACHMAN and LAURENCE S. LACHMAN have hereunto set our hands.

MAURICE LACHMAN.
         LAURENCE S. LACHMAN.

Witnesses:
     REGINALD HAWLEY,
     J. W. CORRIGAN.